United States Patent Office 3,521,436
Patented July 21, 1970

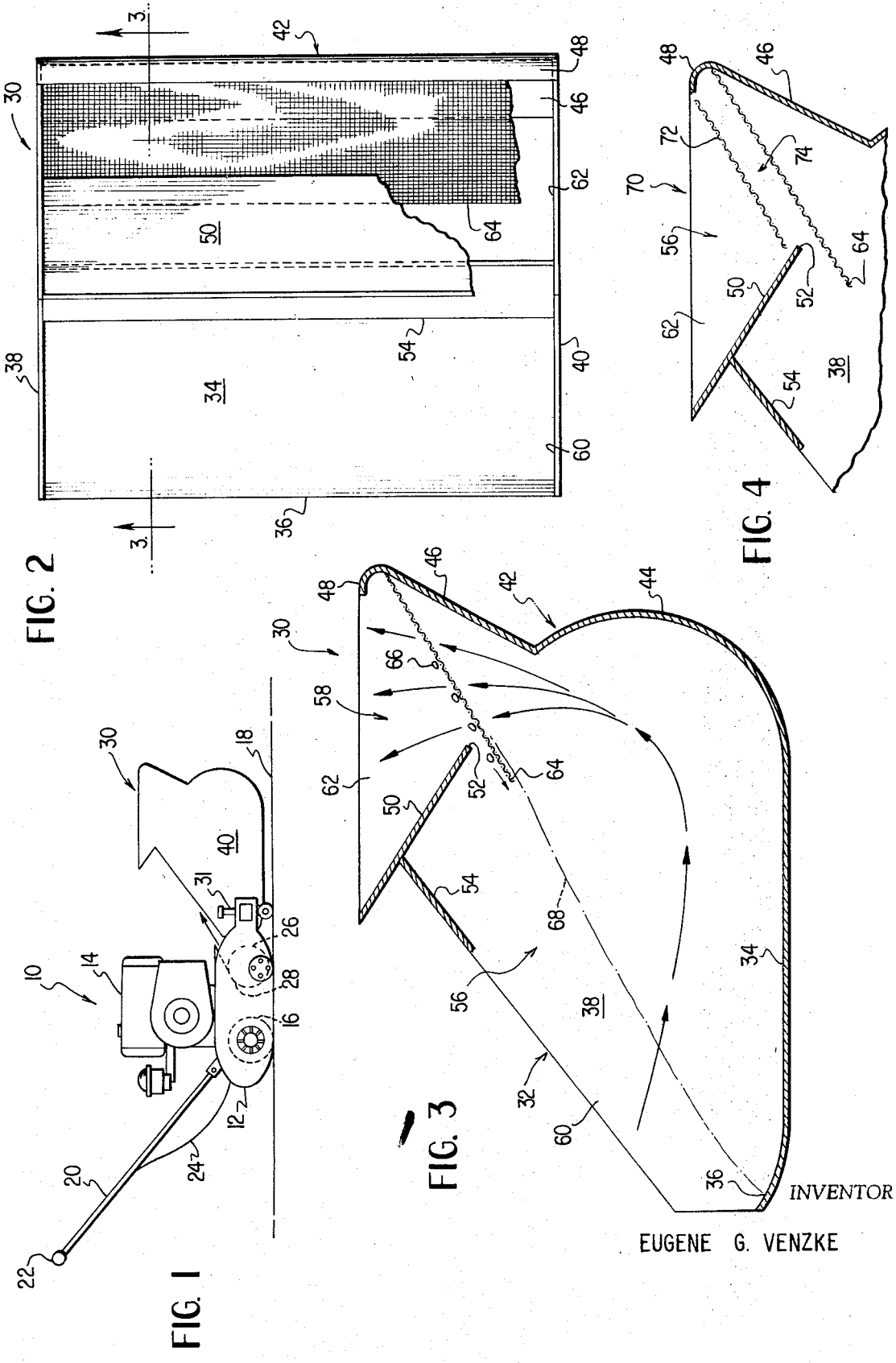

3,521,436
GRASS CATCHER HAVING MEANS TO REDUCE VELOCITY OF AIR-GRASS STREAM AND MOWER THEREWITH
Eugene G. Venzke, 4051 Perkiomen Ave., Reading, Pa. 19606
Filed Sept. 14, 1967, Ser. No. 668,305
Int. Cl. A01d 35/24
U.S. Cl. 56—199          11 Claims

ABSTRACT OF THE DISCLOSURE

There is described a grass catcher having an upwardly divergent structure to reduce the velocity of an air-grass stream below the velocity necessary to carry substantial amounts of grass.

BACKGROUND OF THE INVENTION

This invention pertains to means for collecting grass cuttings in a receptacle. The invention is thought to have greatest applicability on mowers of the type used to cut golf greens but may advantageously be used on other types of mowers.

The three major problems facing a greenskeeper in the care and maintenance of a golf green may be categorized as prevention of grass disease, control of thatch and elimination of undesirable grasses.

It has long been known that most grass diseases are caused by fungous organisms. Considerable plant pathological research has been done in the past decade or two in categorizing the various plant diseases and learning the life cycle of the causative pathogenic fungi. For a more complete discussion, reference may be made to Circular 510 of the College of Agriculture, Extension Service, The Pennsylvania State University.

Although there are many different types of grass diseases having divergent characteristics, the causative pathogenic fungi have basic common characteristics. Fungi are, of course, plant organisms that do not contain the green pigment chlorophyll and hence cannot produce their own food as other plants do. Consequently, fungi require organic material from dead or decaying green plant parts, or must attack and feed on living green plants. Since the best environment for the growth of fungi is a moist dark organic medium, it will be evident that an accumulation of grass cuttings provides a prime spot for fungi growth. It has accordingly been long established that an accumulation of grass cuttings on a golf green is to be avoided, if an effort is to be made to prevent grass diseases.

In order to prevent accumulation of cuttings on golf greens, greens mowers have long been equipped with grass catchers, as is evidenced by the showing in U.S. Pat. 1,816,980. The showing of the grass catcher in this patent was typical of grass catchers thirty-five years ago, and although great strides have been made in the technological aspects of greenskeeping since then, the grass catcher in the aforementioned patent is representative of the grass catchers used today on greens mowers as is evidenced by U.S. Pats. 3,099,122 and 3,176,453.

The grass catchers presently in use on greens mowers are positioned on the front end of the mower because of the requirements of the mower. The grass catchers are comprised of a receptacle having an opening therein facing the cutting reel of the mower. Because of the air currents created by the cutting reel, an air-grass stream is propelled into the opening of the receptacle. Since the only opening in the receptacle is in the back facing the cutting reel, the air stream is deflected by the front of the receptacle and exhausts through the same opening through which the stream entered. As will be pointed out more fully hereinafter, the grass catcher of this invention is characterized by a receptacle having the customary reel-facing opening through which the air-grass stream enters and a second upwardly facing opening through which only the air exhausts thereby leaving substantially all of the grass in the catcher.

The main attack on grass diseases has been by the use of fungicidal chemicals. A great deal of effort has been expended in the control of fungi by chemical application as may be deduced from pamphlet AG–232 of Rohm and Haas published April 1966 and Turfgrass Guide of the College of Agriculture Extension Service, Pennsylvania State University. The main thrust of chemical treatment of grass diseases has been the prevention of growth of fungi rather than attempts to control the disease once it has spread.

Because of numerous complaints of greenskeepers, a large manufacture of greens mowers has recently modified its mower in an attempt to prevent the exhaust stream of the mower engine from interfering with grass flow into the grass catcher. Although the modification has minimized the effect of the engine exhaust on the collection of grass in the grass catcher, applicant has found that the failure of the receptacle to collect substantially all of the grass clippings is caused by a more basic problem.

As mentioned previously, the second major problem facing greenskeepers is the control of thatch. Thatch is a collection of grass clippings, leaves and stems that accumulates on an often cut grass surface which ultimately becomes tightly intermingled and which has the appearance of felt padding. There are many problems associated with the development of thatch on golf greens. Included in these problems is that thatch tends to become impervious to air and moisture thereby preventing the grass roots from receiving the required air and water. An accumulation of thatch harbors insects and disease pests and may be associated with the winter killing of Tifgreen Bermuda grass. Thatch may also act as a compost layer in the soil which results in an elevated surface temperature because of the organic decay process. Consequently, thatch may produce scalding of the turf in hot weather. For a more complete description of the problems associated with thatch accumulation, reference may be had to the Golf Superintendent, September-October 1966, page 20, and the Golf Course Reporter, July 1965, page 8.

Thatch is presently controlled in a variety of ways. It is of course, advisable to remove as many of the grass clippings from the surface immediately after cutting to avoid the accumulation. With presently used grass catches, thatch builds up at a greater or lesser rate and is controlled in a variety of ways. The most effective means of removing thatch from a golf green is by manual raking, although it will be apparent that this is an onerous and expensive proposition. After manually raking a green, it is not uncommon to remove many truckloads of thatch which will indicate the extent of accumulation in a few years time.

Quicker and less expensive means of thatch control have recently come into vogue. One of these means is the use of an aerator which is a powered machine driven across the putting surface which generally cuts and removes cylindrical plugs from the surface in order to allow air and water movement through the thatch layer. A disadvantage of this type of control is that the putting surface is quite irregular for a considerable length of time to the chagrin of the players.

Another recently popularized means of controlling thatch is the use of a verticutter. This is a powered machine having a plurality of vertical discs that cut the putting surface and the thatch layer to allow air and the water movement therethrough. Verticutting a green renders it unplayable for a period of time which means that the course must either be provided with temporary greens or that the course must be shut down for the required period.

As previously mentioned, the third major problem facing the greenskeeper is the control of undesirable grasses. One of the major undesirable grasses is poa annua which is an annual grass producing the enormous number of seeds necessary for survival. Poa annua is cold weather grass which is thick and would make a desirable golfing grass except that it dies immediately during the first warm period. Consequently, golf courses must prevent the growth of poa annua or face large brown dead grass areas during the summer.

The control of undesirable grasses is presently limited to chemical treatment. The main thrust of chemical applications to prevent the growth of undesirable grasses, particularly poa annua is to prevent the germination of the undesirable seeds. As will be pointed out more fully hereinafter, it is believed that the present invention will tend to eliminate undesirable grasses, particularly poa annua, since the great bulk of the seeds produced by the mature grass will be caught in the grass catcher thereby breaking the life cycle of the undesirable grass.

In light of the long standing problems of grass disease, thatch control, and elimination of undesirable grasses, all of which have been long recognized by the art, it is believed to be established that problems exist which will be either partially or fully obviated by the improvement and efficiency of a grass catcher. Since the attempts made to improve the efficiency of grass catchers used on greens mowers have not been successful it is submitted that the classic situation exists where there is a known long standing problem in the art where others have failed to provide adequate solutions.

SUMMARY OF THE INVENTION

In light of the aforementioned problems of greenskeepers, the grass catcher of this invention is designed to maximize the recovery of grass clippings in order to prevent the creation of a fungi growing environment, to prevent the accumulation of grass clippings required to develop thatch and to collect a sufficient number of seeds of undesirable grasses to minimize the problem of control thereof. In order to maximize clipping recovery, the invention makes use of a number of operating principles, most of which are only vaguely understood at this time. Among the operating principles used by the device of this invention to recover grass clippings from an air-grass stream are: (1) reduction of the velocity of air-grass stream at an appropriate location so that the stream is no longer capable of carrying the grass component, (2) an electrostatic process wherein grass clippings are collected on a foraminous member and (3) the creation of a fluidized bed wherein grass particles constitute the solid phase with the air-grass stream being passed through the fluidized bed wherein a substantial part of the grass component is trapped.

Since the present invention has demonstrated an increased efficiency in the collection of the grass cuttings from the air-grass stream, it is believed apparent that the fungi growth promoting environment is largely or wholly eliminated, that thatch accumulation is largely avoided and that large number of undesirable grass seeds are accumulated.

It is accordingly an object of the present invention to provide a means for removing grass cuttings from an air-stream.

Another object of this invention is to provide a grass catcher for a greens mower that increases the efficiency of collecting grass cuttings from an air-grass stream.

Still another object of this invention is to provide a grass catcher which may be easily and inexpensively manufactured using many of the techniques presently used in the making of grass catchers.

Another object of the invention is to provide a method and means for accumulating grass clippings in a receptacle wherein the velocity of the air grass stream is reduced at an appropriate location below that value where the air is no longer capable of carrying the grass component.

Still another object of the invention is to provide a means for accumulating grass clippings in a receptacle wherein grass clippings are accumulated on a foraminous member.

A still further object of the invention is to provide means for accumulating grass clippings by the creation of a fluidized bed.

Other objects, advantages and important features of this invention will be apparent from a study of this specification following, taken with the drawings which together describe, disclose, illustrate and show a preferred embodiment of the invention, and what is now considered and believed to be the best mode of practicing the principles thereof. Still other embodiments, modifications, procedures, and equivalents may occur to those having the benefit of the teaching herein.

BRIEF DESCRIPTION OF THE DRAWING

FIG. 1 is a side view of a suitable greens mower equipped with a grass catcher made in accordance with the principle of the invention;

FIG. 2 is an enlarged top view of the grass catcher of FIG. 1;

FIG. 3 is a longitudinal cross-sectional view of the grass catcher of FIG. 2 taken substantially along line 3—3 thereof as viewed in the direction indicated by the arrows; and FIG. 4 is a partial view of another modification of the invention.

DESCRIPTION OF THE PREFERRED EMBODIMENT

Attention is now directed to FIG. 1 wherein there is shown a mower 10 of the type capable of being used on a golf green. The mower 10 comprises a frame 12 on which is disposed a suitable prime mover or engine 14 operatively driving a roller 16 engaging a ground surface 18. A handle 20 having a crossbar 22 is operatively connected to the frame 12 and carries a control wire 24 leading to the crossbar 22 so that an individual may control the operation of the mower 10 in a known manner.

A cutting reel 26 is carried by the frame 12 for rotation about an axis transverse to a direction of travel of the mower 10 and is drivably rotated by suitable power transmission means (not shown) connected to the engine 14. The cutting reel 26 is usually characterized by a plurality of helical blades rotating in a clockwise direction as viewed in FIG. 1. A suitable deflector 28 is provided rearwardly of the cutting reel 26 and acts to guide or deflect the air-grass stream resulting from the rotation of the cutting reel 26 in the direction indicated by the arrow in FIG. 1. Disposed in front of the mower 10 and operatively connected thereto receive the air-grass stream is a grass catcher 30 made in accordance with the invention.

It should be pointed out that while the invention is described in conjunction with greens mowers of the type described, the principles of the invention may be applied whenever it is desired to increase the efficiency of a grass catcher. While the problems pointed out hereinabove are most acute in the tending of golf greens because of the necessity of frequent cutting, similar problems occur in the maintenance of less frequently cut grassy areas. Consequently, the grass catcher of the invention may be used with a rear discharge reel type mower or with a rotary mower used to cut longer grasses.

The grass catcher 30 is secured to the mower 10 by suitable connections 31 and is comprised of a receptacle 32 having a bottom wall 34 with an upturned edge 36 on the rear end thereof. First and second sidewalls 38, 40 extend upwardly from the bottom wall 34 as does a front wall 42. The front wall 42 is comprised of a first portion 44 which is concave generally toward the mower 10 and the second upwardly inclined portion 46 extending away from the mower 10. The upper end of the second front wall portion 46 provides an arcuate lip 48 extending generally toward the mower 10.

The receptacle 32 also comprises a first transverse partition 50 extending between the sidewalls 38, 40. The first partition 50 is illustrated as inclined such that an imaginary extension thereof would intersect the junction of the first and second front wall portions 44, 46. The first partition 50 is spaced from the front wall 42 to form a passage 52 therebetween for purposes more fully pointed out hereinafter. The receptacle 32 also comprises a second transverse partition 54 extending between the sidewalls 38, 40 and abutting the first partition 50. It will be seen that the partition 50 acts to divide the receptacle 32 into a first compartment or grass collection zone 56 and a second compartment or air-grass separation zone 58 elevated with respect thereto. It will also be noted that the receptacle 32 provides an enlarged inlet opening 60 through which air-grass stream moves. It will also be seen that an upwardly facing exhaust opening 62 is provided in the second compartment 58 in order to allow the air component of the stream to escape from the receptacle 32.

The grass catcher structure as heretofore described constitutes one of the first embodiments made of the invention. It was found that the device was somewhat more efficient than the conventional grass catcher which is believed to be attributed to three factors. The first factor responsible for the increased efficiency of the heretofore described embodiment is the provision of an exhaust opening separate from the inlet opening. One of the difficulties believed to exist in the grass catchers of the prior art is that the air-grass stream moves into the grass catcher with the air subsequently escaping through the inlet opening which interferes with inlet movement.

The second factor believed responsible for the increased efficiency of the heretofore described structure is that after the air-grass stream moves through the passage 52, the velocity thereof is reduced because of the expanded flow area of the upper portion of the second compartment 58. The reduction of the air velocity in the second compartment 58 allows the grass-component to fall out of the moving air stream and consequently enhances the efficiency of the device.

The third factor thought to be operative to remove some of the grass clippings from the inlet air grass stream is the creation of a fluidized bed within the compartment 56. There is produced within the compartment 56 a swirling mass of grass particles when the mower 10 is in use. Because of the multiplicity of solid phrase particles in the compartment 56, some of the newly added grass particles of the inflowing air-grass stream impinge upon the grass particles of the fluidized bed thereby leaving behind in the compartment 56 an appreciable quantity of the grass particles of the inflowing air-grass stream.

Although the structure as heretofore described is somewhat more efficient that the grass catcher of the prior art, it was noted that a perceptible quantity of grass escaped through the outlet opening 62. In an attempt to minimize grass escape through the outlet opening 62, a screen 64 was positioned as indicated in FIGS. 2 and 3. The screen 64 is inclined with respect to the horizontal to the upper end thereof being secured to the second front wall portion 46 adjacent the upper end thereof. For purposes that will be explained more fully hereinafter, the screen 64 extends through the passage 52 and terminates in the first compartment 56 of the receptacle 32. In the illustrated embodiment, the screen extends approximately two inches into the first compartment 56.

The provision of the screen 64 has led to vastly improved efficiency as compared to the conventional grass catcher. For example, one test was run on a conventional greens mower with a conventional grass catcher and with a grass catcher made in accordance with FIGS. 2 and 3. The area chosen to be cut was selected from a green which had been cut the previous day. The baskets were weighed before and after the cutting operation. Precautions were taken to insure that the same area of grass was cut when using both the prior art grass catcher and the device of the invention. Because the device of the invention is slightly heavier than a conventional grass catcher, a weight was added to the conventional grass catcher in order to eliminate any distortion in results which might accrue from the difference in weight. The results showed that prior art grass catcher collected 8.5 lbs. of grass cuttings whereas the device of the invention collected 12.0 lbs. of clippings. It will accordingly be apparent that the device of the invention is considerably more efficient than the prior art devices and therefor acts to eliminate the underlying causes of grass diseases and thatch accumulation as well as to remove appreciable numbers of undesirable grass seeds.

It is recognized that screens are conventionally incorporated in grass catchers used with other types of mowers. For reasons that are pointed out hereinafter, it will be apparent that the screen 64 functions in an entirely different manner than screens used on other types of mowers.

Initially it should be recognized that the clippings from a greens mower are normally quite small and generally are in the range of $\frac{1}{32}$ inch to $\frac{1}{8}$ inch in length. Since golf greens are normally cut every day or two, the reasons for the small clippings will be readily apparent. The screen 64 should be selected such that the clippings are capable of passing therethrough rather than clogging the screen. For example, a one-sixteenth inch mesh screen was found undesirable because the screen clogged before the receptacle 32 was full. A screen having a $\frac{1}{4}$ inch mesh, on the other hand, was found to be quite successful and did not clog during operation. Since the grass clippings are much smaller than the mesh of the screen, it will be evident that the screen does not itself act wholly to filter out the grass components of the air grass stream.

The following tabulated data is offered to indicate screen efficiencies for recovering wet grass clippings approximately $\frac{1}{16}$ inch in length:

TABLE I

| Type of catcher | Condition | Recovery, lbs. |
|---|---|---|
| Conventional | | 8.5 |
| $\frac{1}{16}$ inch mesh, inclined | Clogged | |
| $\frac{1}{4}$ inch mesh, inclined | No clogging | 12.5 |

The following tabulated data is offered to indicate screen efficiencies for recovering dry grass clippings approximately $\frac{1}{16}$ inch in length:

TABLE II

| Type of catcher | Condition | Quantity of grass lost |
|---|---|---|
| $\frac{1}{8}$ inch mesh, horizontal | No clogging | Perceptible loss. |
| $\frac{1}{8}$ inch mesh, inclined | do | Little loss. |

The following tabulated data is offered to indicate screen efficiencies for recovering dry grass clippings approximately 1 inch in length:

TABLE III

| Type of catcher | Condition | Quantity of grass lost |
| --- | --- | --- |
| No screen, vertical opening | No clogging | Large loss. |
| ⅛ inch mesh, horizontal | do | Little loss. |
| ⅛ inch mesh, inclined | do | Very little loss. |
| ¼ inch mesh, horizontal | do | Perceptible loss. |
| ¼ inch mesh, inclined | do | Very little loss. |
| ½ inch mesh, horizontal | do | Moderate loss. |
| ½ inch mesh, inclined | do | Do. |

Several deductions can be made from the experiments performed. First, the use of the screen 64 improves the efficiency of the catcher 30. Second, the inclination of the screen 64 gives better results than if the screen is placed horizontally at the outlet opening 62. Third, the use of a fine screen can lead to clogging thereof particularly if the grass is moist. Fourth, the efficiency of the screen 64 is improved if the screen mesh is less than ½ inch and greater than ¹⁄₁₆ inch.

It is believed that numerous operative principles act to facilitate the removal of grass clippings from the air-grass stream past through the grass catcher 30. When the receptacle 32 is less than full, the passage of air therethrough creates a swirling mass of grass particles in the first compartment 56 with the air moving in the direction shown by the solid arrows in FIG. 3. The swirling mass of grass particles within the first compartment 56 is believed to operate in much the same manner as the fluidized bed with a portion of the grass component of the air-grass stream being trapped in the fluidized bed. It is believed that the swirling grass particles within the first compartment acts to remove a portion of the grass component of the air-grass stream passing therethrough by physical impingement of the grass particles in the air-grass stream on the grass particles already present in the first compartment 56. Since the passage 52 is remotely disposed from the inlet opening 60, it will be apparent that the exhaust of air from the grass catcher 30 has a minimal effect on the movement of the air-grass stream through the inlet opening 60.

The second operative principal utilized in the device of this invention to separate grass particles from the air-grass stream is a reduction in the velocity of the stream after it moves through the passage 52. In a working example of the grass catcher 30, the passage 52 is approximately four inches in width as measured along an imaginary extension of the first partition 50. Since the outlet opening 62 is approximately three times the cross secitonal area of the passage 52, and since the lip 48 tends to deflect the air stream through the entire extent of the outlet opening 62, it will be seen that the velocity of the air grass stream is significantly lowered in the second compartment 58. There is also a significant pressure drop across the screen 64 which acts further to reduce the velocity of the air grass stream. Since the velocity of the air grass stream is lowered below the level necessary for the stream to carry the grass component, the grass component falls onto the screen 64 and thereafter tends to settle on the upper surface thereof. For reasons that are not entirely understood, the grass components coalesce into relatively large bodies 66 of grass on the upper surface of the screen 64, particularly when the grass is moist. Since the screen 64 is inclined toward the first compartment 56, the bodies 66 tend to gravitate down the screen 64 into the first compartment 56.

In order to enhance the process of collecting a bodies 66 of grass, the screen 64 is preferably vibratile. This may be achieved in a variety of manners as, for example, by the use of a bodily flexible screen or by the use of a loose connection between the screen and the receptacle 32. The motive power tending to vibrate the screen 64 is received from the inherent vibrations of the engine or prime mover 14 of the mower 10. Since the grass catcher is operatively connected to the mower 10, it will be evident that the vibrations resulting from the operation of the engine 14 act to vibrate the grass catcher 30 and consequently the screen 64.

After the grass catcher 30 has been used for any length of time in the collection of clippings, a close inspection of the screen 64 reveals that there are numerous grass particles clinging thereto. Since the appearance of the grass particles clinging to the screen 64 is similar to iron filings collected on a magnet, it is concluded that an electrostatic potential has developed between the screen 64 and the grass particles thereby tending to deposit the grass particles on the screen 64.

A close examination of the grass catcher 30 in use prior to the time that the receptacle 32 is substantially full reveals that a few grass particles escape from the outlet opening 62. However, after the grass catcher has been used so that the receptacle 32 is filled to the dotted line level 68, continued close examination of the outlet area reveals that substantially no grass particles escape from the outlet opening 62. One reason for the increased operational efficiency of the grass catcher 30 as it becomes substantially full is believed to be due to the increased efficiency of the fluidized bed effect created in the first compartment 56. Since there are a greater number of grass particles present in the first compartment 56 as the receptacle 32 becomes filled, it will be seen that the incoming air-grass stream is presented with a greater number of grass particle targets in the first compartment 56 so that fewer of the grass particles escape through the passage 52 which is now limited to the area between the lower end of the partition 50 and the screen 64. Another reason for the increased efficiency of the grass catcher 30 as it becomes substantially full is believed to be due to the increased change in velocity of the air grass stream due to the restricted nature of the passage 52. In the illustrated embodiment, the distance from the end of the partition 50 to the screen 64 is on the order of about one inch. Since the outlet opening 62 is of constant size, it will be seen that a greater change in velocity occurs and consequently a greater portion of the grass component falls out of the exhaust air stream.

As pointed out previously, one function of the lip 48 is to deflect the exhaust air stream throughout the extent of the outlet opening 62. A collateral function of the lip 48 is to deflect the exhaust air stream rearwardly toward the mower 10 in a path vertically spaced from the inlet air-grass stream. As previously mentioned, close observation has shown that a few grass particles escape from the outlet opening 62. Since the exhaust air stream is directed rearwardly toward the mower 10, the remaining heavier grass particles tend to gravitationally settle and are inducted by the inlet air grass stream, into the inlet opening 60 where the separation processes are again operative to remove any cuttings that have once escaped the grass catcher 30.

Attention is now directed to FIG. 4, wherein common reference characters designate elements common to the embodiments of FIGS. 2 and 3, wherein there is illustrated a grass catcher 70 made in accordance with the principles of the invention. The only difference between the grass catcher 70 and the grass catcher 30 constitutes the use of an additional screen 72 above the screen 64.

The screen 72 is secured between the sidewalls 36, 38 in any suitable fashion. Preferably, the screen 72 is removably affixed thereto and extends toward the partition 50 and terminates slightly above the passage 52 to define a pocket 74 above the screen 64. The screen 72 is smaller than the screen 64 and in one operating device of the invention is a ⅛ inch screen mesh with the screen 64 being a ¼ inch screen mesh.

The sides of the screen 72 are preferably spaced slightly from the side walls 38 and from the front wall 46 to allow an additional escape for air passing through the second compartment 58 in the event that the pressure thereof increases between the screens 64, 72.

By the use of the two screens 64, 72 it was found that the catcher 70 is more efficient in recovering grass clippings, particularly where the cut grass particles are small and dry. It is believed that the screen 64 acts to collect most of the larger particles in the air-grass stream with the screen 72 acting to collect the smaller particles that escape collection on the screen 64. Since the screen 72 is preferably removably mounted on the catcher 70, it will be seen that the screen 72 may be removed in the event that large wet grass cuttings are being collected.

The device of the invention presents several additional advantages over the grass catchers of the prior art. One of the disadvantages of the prior art grass catcher is that the grass accumulated therein tends to locate in a mound located centrally of the bottom wall. Because of the angle of repose of grass cuttings, the front of the receptacle is not full when the grass accumulated therein begins to fall out of the rear of the receptacle between the mower and the grass catcher. Since the operator can see into the front of the receptacle, which is only partially full, the operator usually does not empty the grass catcher until long after grass is falling out the rear thereof. This, of course, tends to add to the inefficiency of the prior art catchers and tends to promote cutting accumulation with all the attendant problems noted previously.

This is to be contrasted to the device of the invention wherein the grass tends to accumulate at the front of the receptacle 32 as indicated by the level 68. Accordingly, little or no grass tends to fall out of the rear of the receptcle. Furthermore, the operator sees that the front of the receptacle is full and accordingly empties the basket before such loss of grass occurs. Since the grass catcher 30 accumulates more cuttings per given area of grass cut, the number of times the catcher 30 is emptied during the course of a large cutting operation is about the same as in the prior art catchers.

Another advantage accruing to the catcher 30 is that the weight of the grass at the front end of the receptacle 32 tends to lower the front end of the catcher 30 and consequently acts to slitghtly lower the cutting reel 26. Accordingly, a closer cut may be obtained with a mower equipped with the grass catcher 30 than with a prior art catcher of similar size and configuration.

While the invention has been described, disclosed, illustrated and shown in terms of a preferred embodiment that it has assumed in practice, the scope of the invention should not be deemed to be limited by the precise modification herein shown, described, illustrated and disclosed, such other embodiments, modifications, and arrangements being intended to be reserved especially as they fall within the scope of the claims here appended.

What is claimed is:
1. A grass catcher comprising
an open back open top receptacle having a bottom wall, side walls and a front wall arranged to direct a fluid stream from the open back through the receptacle and out the open top;
means dividing the receptacle into a grass collection zone in communication with the open back and an air-grass separation zone thereabove in communication with the open top; and
means defining an upwardly diverging structure in the air-grass separation zone for reducing the velocity of the fluid stream below the velocity necessary to carry substantial amounts of grass.
2. The grass catcher of claim 1 comprising
a foraminous member extending across the fluid path and downwardly inclined from a location in the air-grass separation zone to a location in the grass collection zone for receiving grass in the separation zone and transmitting same into the collection zone.
3. The grass catcher of claim 2 wherein the foraminous member is a screen having openings therein between ⅛ inch and ½ inch in size.
4. The grass catcher of claim 2 further comprising
a second inclined foraminous member in the separation zone in spaced relation above the first mentioned foraminous member, the second foraminous member having passageways therein smaller than those of the first foraminous member.
5. The grass catcher of claim 1 wherein the means dividing the receptacle comprises a partition extending between the side walls and the means defining an upwardly diverging structure comprising the partition and the front wall.
6. The grass catcher of claim 5 wherein the partition is downwardly inclined toward the front wall and wherein the receptacle further comprises a second partition extending between the side walls and inclined oppositely from the first mentioned partition, the second partition being juxtaposed to the first partition.
7. The grass catcher of claim 1 further comprising means defining a lip disposed at the upper front portion of the air-grass separation zone and extending rearwardly toward the back of the grass catcher for deflecting the fluid stream rearwardly.
8. A mower comprising
a ground engaging roller rotatable about an axis transverse to the direction of travel;
a cutting reel disposed in front of the roller and rotatable about an axis transverse to the direction of travel for cutting grass and discharging the cut grass to the front of the mower; and
a grass catcher operatively connecting to the mower and disposed at the front end thereof for catching the cut grass, the grass catcher comprising
an open back open top receptacle having a bottom wall, side walls and a front wall arranged to direct a fluid stream from the open back through the receptacle and out the open top;
means dividing the receptacle into a grass collection zone in communication with the open back and an air-grass separation zone thereabove in communication with the open top; and
means defining an upwardly diverging structure in the air-grass separation zone for reducing the velocity of the fluid stream below the velocity necessary to carry substantial amounts of grass.
9. The combination of claim 8 wherein the air-grass separation zone communicates with the grass collection zone through an opening disposed adjacent the front wall of the receptacle.
10. The combination of claim 8 comprising
a foraminous member extending across the fluid path and downwardly inclined from a location in the air-grass separation zone to a location in the grass collection zone for receiving grass in the separation zone and transmitting same into the collection zone.
11. The combination of claim 10 wherein the foraminous member is a screen having openings therein between ⅛ inch and ½ inch in size.

References Cited

UNITED STATES PATENTS

| 639,346 | 12/1899 | Brennan | 56—199 |
| 666,689 | 1/1901 | Phillips | 56—199 X |
| 3,191,370 | 6/1965 | Epstein | 56—202 |

F. BARRY SHAY, Primary Examiner

U.S. Cl. X.R.

15—79; 56—202